United States Patent [19]

Dick

[11] Patent Number: 5,143,427
[45] Date of Patent: Sep. 1, 1992

[54] DRIVE WHEEL CONNECTION FOR A TOY VEHICLE AND METHOD OF ASSEMBLY

[75] Inventor: Larry C. Dick, Sugar Bush Knolls, Ohio

[73] Assignee: The Little Tikes Company, Hudson, Ohio

[21] Appl. No.: 703,606

[22] Filed: May 21, 1991

[51] Int. Cl.⁵ .............................................. B60B 27/02
[52] U.S. Cl. ...................................... 301/111; 301/2.5; 301/122
[58] Field of Search .................... 301/1, 2.5, 111, 112, 301/118, 121, 122, 124 R, 126, 131, 132

[56] References Cited

U.S. PATENT DOCUMENTS

| | | | |
|---|---|---|---|
| 2,994,559 | 8/1961 | Carlson et al. | 301/2.5 |
| 5,014,392 | 5/1991 | Melara | 301/122 X |

FOREIGN PATENT DOCUMENTS

| | | | |
|---|---|---|---|
| 2841854 | 8/1979 | Fed. Rep. of Germany | 301/1 |
| 412691 | 7/1934 | United Kingdom | 301/1 |

Primary Examiner—Russell D. Stormer
Attorney, Agent, or Firm—Renner, Kenner, Greive, Bobak, Taylor & Weber

[57] ABSTRACT

A drive wheel assembly (10) for a toy vehicle includes an axle (11), a wheel (13) and a bushing (12) insertable into the hub (30) of the wheel (13). The hub (30) is provided with a generally axial aperture (32) communicating with a tapered aperture (34). The bushing (12) has a generally axial aperture (19) therein to receive the axle (11) therethrough. The bushing (12) also includes an expandable annular locking member (24) at the end thereof which, as the axle (11) is being inserted in the aperture (19), expands to engage the inner walls of the tapered aperture (34).

12 Claims, 3 Drawing Sheets 5,143,427

DRIVE WHEEL CONNECTION FOR A TOY VEHICLE AND METHOD OF ASSEMBLY

TECHNICAL FIELD

This invention relates to an axle and wheel assembly for a toy vehicle, particularly of the type that is manually moveable by a child through the use of pedals turning the axle. More specifically, this invention relates to the manner in which a pedal crankshaft axle is affixed to the wheels to drive the same and move the toy vehicle.

BACKGROUND ART

For purposes of economic manufacture, most children's toy vehicles, such as those operated by pedals, are made with wheels formed of an inexpensive plastic such as polyethylene. As such, it is not possible to make a direct connection between the wheel and the traditional metallic pedal axle because the plastic wheel cannot support the axle in a driving relationship. Thus, typically a bushing made, for example, of nylon is insert-molded in the wheel to provide the support to drivingly receive the pedal axle. However, such an insert molding process is tedious, time-consuming and expensive, resulting in product which is more costly to manufacture than desirable. Moreover, because the nylon bushing is permanently molded into the polyethylene wheel, should there be a flaw in the final product such that it would be desirable to use its material only as scrap, unless the bushing is physically cut out of the wheel, which necessitates another manual procedure, the wheel cannot be ground up and the plastic reused because the polyethylene would be contaminated having the nylon interspersed therein.

Another problem with respect to prior art children's toy pedal driven vehicles is in the ability to provide a connection between the axle and the wheel so as to assure an efficient direct transfer of energy from the pedal to the wheel while at the same time rendering the vehicle easy to assemble. Of course, as is often the case with toy vehicles, assembly is accomplished by the user and thus it is imperative that ease of assembly be engineered into the product. In the past, however, those products which were desirably easy to assemble provided an inefficient transfer of energy from the pedal to the wheel.

DISCLOSURE OF THE INVENTION

It is thus a primary object of the present invention to provide an assembly to connect an axle to a wheel in a child's toy vehicle which provides for an efficient direct transfer of energy from the axle to the wheel.

It is another object of the present invention to provide an assembly, as above, which provides a dependable manner in which to lock an axle to a molded plastic wheel.

It is a further object of the present invention to provide an assembly, as above, which is economically manufactured and easy to install.

It is yet another object of the present invention to provide a unique method of assembling a crankshaft axle to a plastic wheel in a child's toy vehicle.

These and other objects of the present invention, as well as the advantages thereof over existing prior art forms, which will become apparent from the description of the preferred embodiment to follow, are accomplished by the improvements hereinafter described and claimed.

In general, a drive wheel assembly for a toy vehicle includes an axle, a wheel having a hub, and a bushing. The wheel hub is provided with a generally axial aperture therein extending from the side of the wheel facing the axle. At least a portion of the aperture is tapered. The bushing is positioned in the hub aperture and has an axle receiving aperture extending therethrough. The bushing also is provided with an expandable member which expands to engage the tapered portion of the wheel hub aperture as the axle is inserted into the bushing aperture thereby affixing the bushing to the wheel.

A preferred exemplary drive wheel connection assembly for a toy vehicle incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
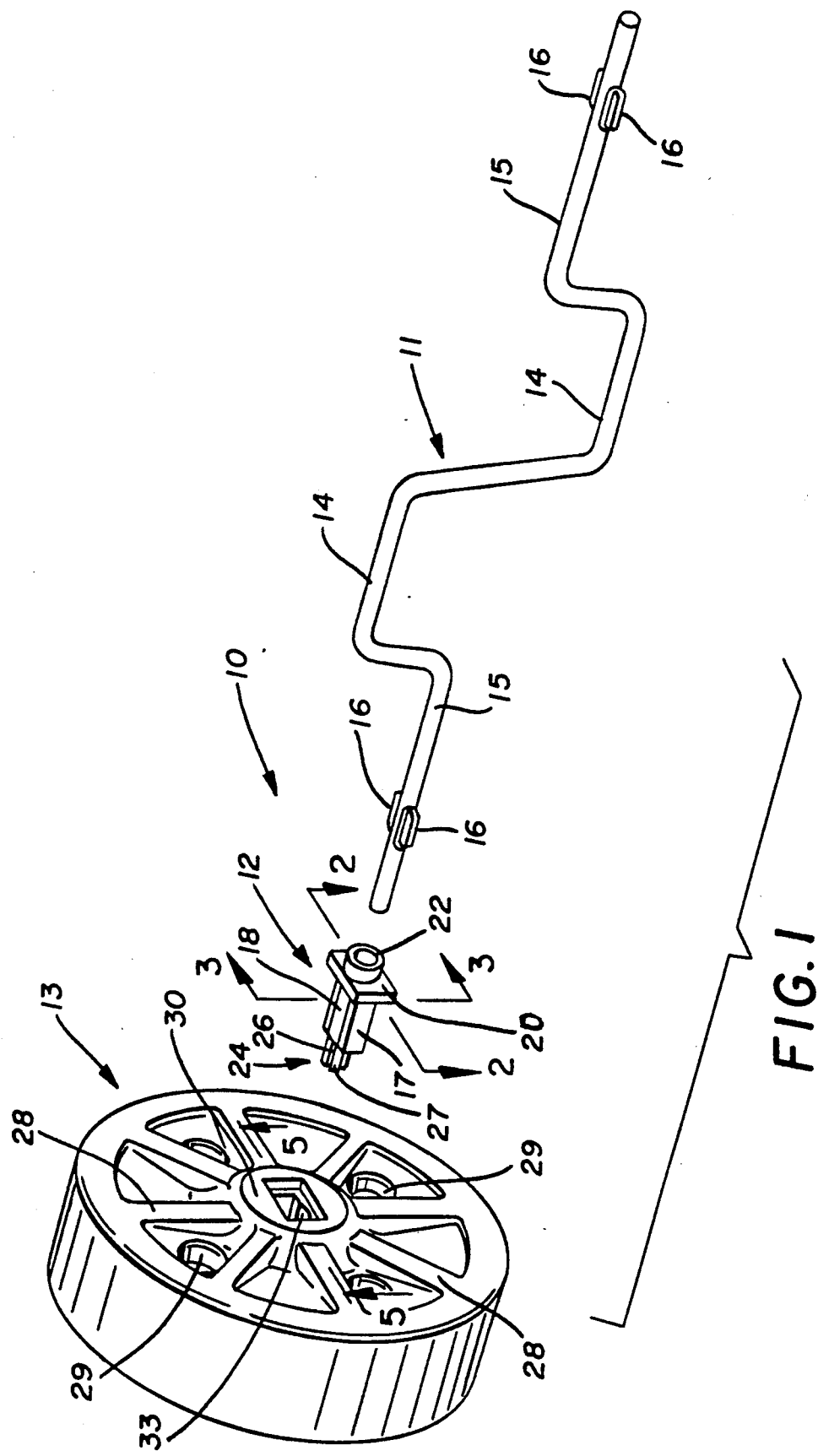
FIG. 1 is an exploded view of the drive wheel assembly made in accordance with the present invention showing a drive crankshaft axle, a bushing and a driven wheel.

A drive wheel assembly for a toy vehicle is shown in exploded form in FIG. 1 and indicated generally by the numeral 10. Assembly 10 includes a pedal crankshaft axle indicated generally by the numeral 11, a bushing indicated generally by the numeral 12, and a wheel indicated generally by the numeral 13. While a complete axle 11 is shown, only one wheel 13 and bushing 12 are shown, it being understood that axle 11 would be provided with an identical wheel and bushing assembly on each end thereof.

Axle 11 is a rather conventionally configured metallic crankshaft axle having pedal receiving areas 14 located generally centrally thereof and axle end portions 15 extending longitudinally outward from each pedal receiving area 14. Each axle end portion 15 is provided with longitudinally extending splines 16 positioned on diametrically opposite sides of axle end portions 15. As will hereinafter be described in detail, splines 16 serve to connect bushing 12 to axle 11 for rotation therewith.

Figure 2:
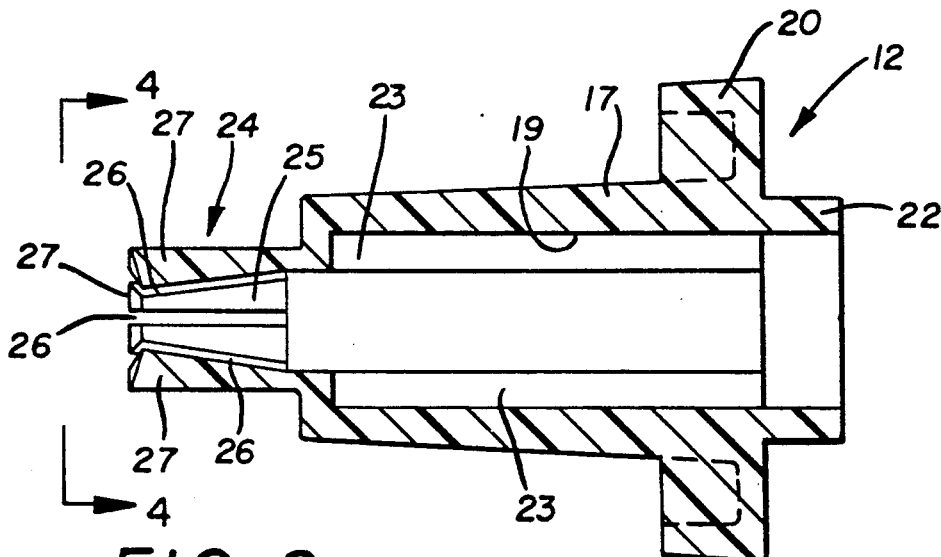
FIG. 2 is a sectional view of the bushing taken substantially along line 2—2 of FIG. 1.
Figure 3:
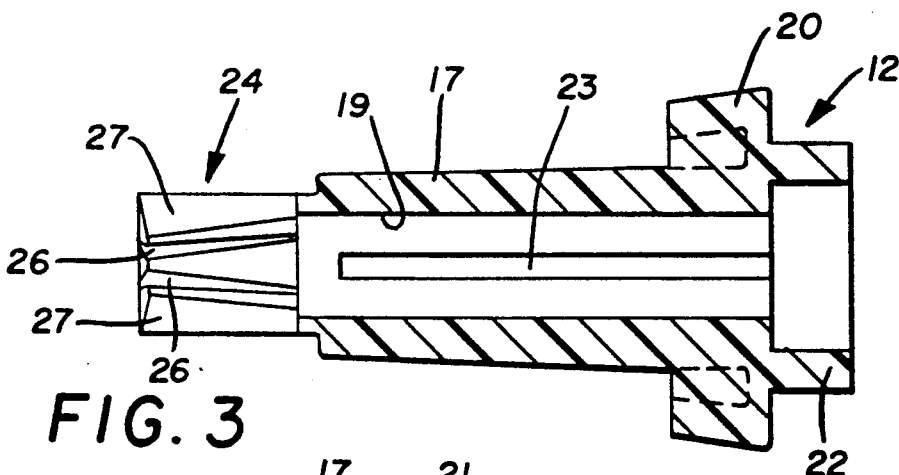
FIG. 3 is a sectional view of the bushing taken substantially along line 3—3 of FIG. 1.
Figure 4:
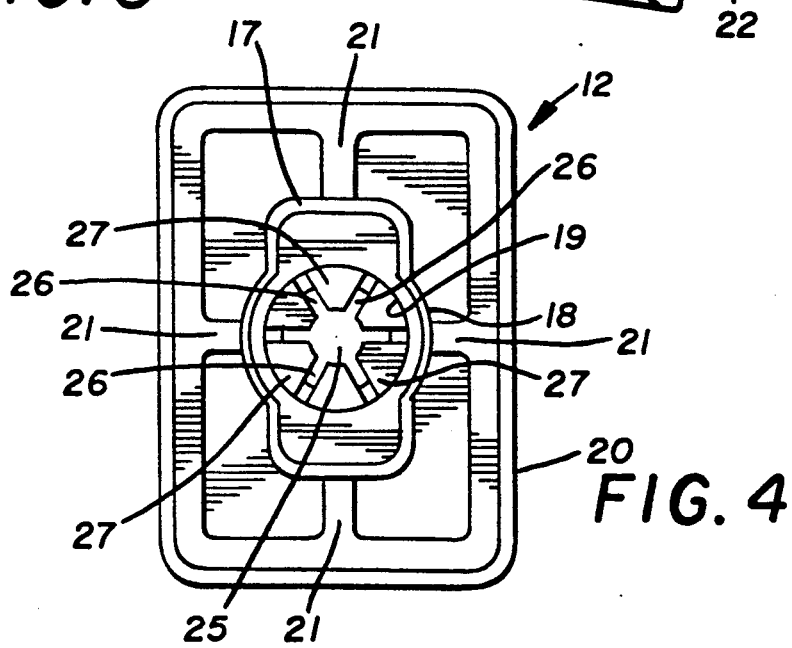
FIG. 4 is an end view of the bushing taken substantially along line 4—4 of FIG. 2.

As best shown in FIGS. 2-4, bushing 12, which may be molded of nylon or some suitably equivalent material, includes a generally rectangular body member 17 having arcuate surfaces 18 on two opposed sides thereof and a central longitudinally extending aperture 19 therein which is adapted to receive axle end portions 15. As shown, body member 17 tapers slightly inwardly from its axle end toward the wheel end. A driving face plate 20 is provided near the axle end having reinforcing webbing 21 extending from the periphery thereof to body member 17. An axle receiving collar 22 is generally concentrically aligned with aperture 19 and extends longitudinally outwardly from plate 20 toward axle 11. Diametrically opposed spline-receiving slots 23 communicate with, and extend substantially the entire length of, aperture 19 terminating just short of the wheel end of body member 17. While the described outer profile of bushing 12 is preferred, it should be evident that any configuration, as long as not round, would be suitable to engage wheel 13 in a manner to be hereinafter described.

Bushing 12 also includes an annular locking member, indicated generally by the numeral 24, extending longitudinally outwardly from body member 17 at the wheel end thereof. Locking member 24 is provided with a tapered aperture 25 which is longitudinally aligned with aperture 19 of body member 17. At the junction of locking member 24 and body member 17, aperture 25 is preferably of a diameter slightly less than the diameter of aperture 19 and generally equivalent to the diameter of axle portion 15. Aperture 25 then tapers inwardly as locking member 24 extends longitudinally outwardly from body member 17 to a diameter substantially less than the diameter of axle portion 15.

The outer profile or walls of locking member 24 are provided with a plurality of longitudinally extending slots 26 therein, thereby forming a plurality of wall segments 27. The precise number of slots 26 and segments 27 are unimportant to this invention; however, what is important is that by so forming locking member 24, segments 27 are radially expandable, under the influence of axle end portion 15, to lock bushing 12 into wheel 13 as will hereinafter be described.

Figure 5:
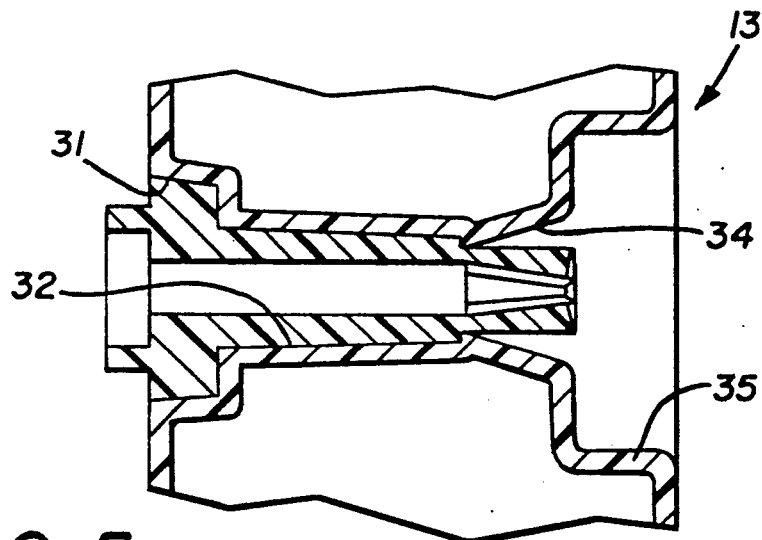
FIG. 5 is a sectional view taken through the wheel substantially along line 5—5 of FIG. 1, but showing the bushing positioned within the wheel hub.
Figure 6:
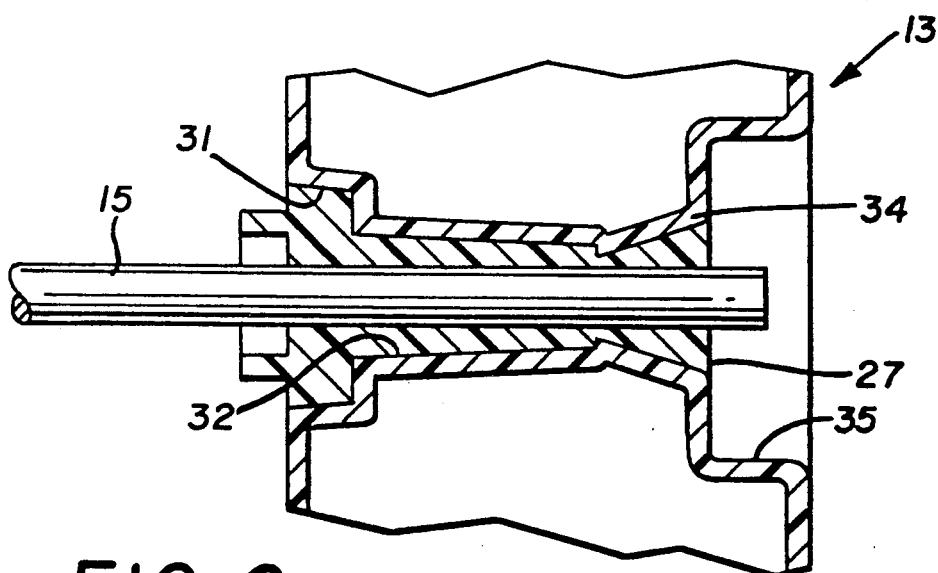
FIG. 6 is a sectional view similar to FIG. 5, but showing the axle positioned within the bushing in a final, locked and assembled condition.

Wheel 13 is preferably molded of an inexpensive plastic material, such as polyethylene, and includes the generally traditional external surfaces for a wheel for a toy vehicle such as simulated spokes 28, lug holes 29 and the like. Wheel 13 is, however, specially configured at the area internally of hub 30. As best shown in FIGS. 5 and 6, in general the internal configuration of the hub area 30 corresponds to and is complementary with the external profile of bushing 12 so that bushing 12 may be snugly received therein. As such, at its bushing and axle receiving end, hub area 30 is configured with a recess 31 to receive face plate 20 of bushing 12. Recess 31 communicates with a central aperture 32 configured and tapered to conform with the taper and shape of body member 17 of bushing 12. It should also be noted that aperture 32 is dished, as at 33 (FIG. 1), on opposed sides to conform to the arcuate surfaces 18 of body member 17 of bushing 12. The inner end of aperture 32 communicates with an outwardly tapered aperture or bore 34 to receive locking member 24 of bushing 12. The outer end of tapered bore 34 communicates with an outer hub recess 35.

In order to assemble the components shown in FIG. 1, bushing 12 is first inserted into the hub area 30 of wheel 13 just described. Such a condition is shown in FIG. 5 wherein it will be noted that all components of bushing 12 generally matingly and drivingly engage the internal surfaces of hub area 30 with the exception that segments 27 of locking member 24 are spaced from and otherwise not engaging the walls of tapered bore 34 in wheel 13. With bushing 12 in this position, axle end portion 15 is inserted through bushing collar 22 and into aperture 19 with the splines 16 aligned with slots 23 in aperture 19. Then by the simple insertion of axle end portion 15 to the end of spline slots 23, the end of the axle spreads segments 27 of locking member 24 so that they engage tapered bore 34 such that bushing 12 is tightly secured to wheel 13, as shown in FIG. 6. At this point, the end of axle 11 is safely positioned with hub recess 35 and a protective cap nut (not shown) may, if desired, be placed over the end of axle 11.

With both ends of axle 11 being similarly mounted to the drive wheels of a toy vehicle, it should be evident that rotation of axle 11, as by the pedaling motion of a child riding in the toy vehicle, will turn the wheels by virtue of the spline 16 to slot 23 connection between axle 11 and bushing 12, by virtue of the complementary configuration of bushing 12 and the inner profile of the wheel hub, and by virtue of the locked position of bushing 12 to wheel 13 in view of the expansion of segments 27 within tapered bore 34, all caused by the simple insertion of axle 11.

It should thus be evident that a drive wheel assembly constructed and assembled according to the concepts of the present invention accomplishes the objects heretofore expressed and otherwise improves the art.

I claim:

1. A drive wheel assembly for a toy vehicle comprising an axle; a wheel having a hub; a generally axial aperture in said wheel hub on the side of said wheel facing said axle, at least a portion of said aperture being tapered; a bushing positioned in said aperture in said wheel hub and having a first axle receiving aperture extending therethrough; said bushing including expandable means having a second axle receiving aperture therein communicating with said first axle receiving aperture; said second axle receiving aperture having a first end and a second end, and being defined by a plurality of expandable segments having slots therebetween; said first end of said second axle receiving aperture having a greater diameter than said second end thereof such that said second axle receiving aperture is tapered from said first end to said second end; said second end having a lesser diameter than the diameter of said axle prior to the insertion of said axle therethrough; said expandable segments being engageable with said tapered portion of said aperture in said wheel hub such that when said axle is positioned in said second axle receiving aperture, said expandable segments engage said tapered portion of said aperture in said wheel hub to affix said bushing to said wheel.

2. A drive wheel assembly according to claim 1 further comprising diametrically opposed and longitudinally extending splines on said axle, said first axle receiving aperture of said bushing having diametrically opposed and longitudinally extending slots communicating therewith to receive said splines.

3. A drive wheel assembly according to claim 1 wherein the outer profile of said bushing is complementary to the inner profile of said generally axial aperture in said wheel hub.

4. A drive wheel assembly according to claim 3 wherein said outer profile of said bushing includes a generally rectangular drive plate on a side of said bushing proximate said side of said wheel facing said axle, and a generally rectangular longitudinally extending tapered body portion adjacent said drive plate.

5. A drive wheel assembly for a toy vehicle comprising an axle; a wheel having a hub; a first generally axial aperture in said wheel hub on the side of said wheel facing said axle; a second generally axial aperture communicating with the inner end of said first aperture; a bushing having an axle receiving aperture extending therethrough, a first outer profile complementary to the inner profile of said first aperture in said wheel hub and having an axle receiving side, and a second outer profile including a plurality of expandable segments having slots therebetween and longitudinally extending from said first outer profile; said bushing being positioned in said first and second apertures in said wheel hub such that when said axle is positioned in said axle receiving aperture, said expandable segments of said second outer profile of said bushing engage the inner profile of said second aperture in said wheel hub to affix said bushing to said wheel.

6. A drive wheel assembly according to claim 5 wherein said aperture in said bushing tapers within said second outer profile from a diameter generally equivalent to the diameter of said axle to a smaller diameter.

7. A drive wheel assembly according to claim 5 wherein said inner profile of said second aperture in said wheel hub is tapered.

8. A drive wheel assembly according to claim 5 further comprising diametrically opposed and longitudinally extending splines on said axle, said axle receiving aperture of said bushing having diametrically opposed and longitudinally extending slots communicating therewith to receive said splines.

9. A drive wheel assembly according to claim 5 wherein said first outer profile of said bushing includes a generally rectangular drive plate on the axle receiving side thereof, and a generally rectangular longitudinally extending tapered body portion adjacent said drive plate.

10. A method of assembling a drive axle to a wheel having a hub comprising the steps of providing a first bushing receiving aperture and a second bushing receiving aperture in the hub of the wheel, positioning a bushing having a first outer profile and a second outer profile therein said first and said second bushing receiving apertures of the wheel hub, said first outer profile having an axle receiving aperture therein, said second outer profile including a plurality of expandable segments having slots therebetween, said expandable segments defining an axle receiving aperture through said second outer profile, said axle receiving aperture of said second outer profile having a first end and a second end wherein said first end has a diameter greater than said second end, and said second end has a diameter less than the diameter of the axle, and inserting the axle into said first end of said axle receiving aperture of said second outer profile in the bushing thereby attaching the bushing to the wheel by expanding said expandable segments to engage said second bushing receiving aperture in the hub of the wheel.

11. A method according to claim 10 wherein the step of inserting the axle includes the step of providing the axle with at least one spline and aligning said at least one spline on the axle with at least one slot communicating with the axle receiving aperture of said first outer profile.

12. A method according to claim 10 further comprising the step of forming the outer profile of the bushing to be complementary to the inner profile of the aperture in the hub of the wheel.

* * * * *